(12) United States Patent
Kiessling et al.

(10) Patent No.: US 6,915,124 B1
(45) Date of Patent: Jul. 5, 2005

(54) METHOD AND APPARATUS FOR EXECUTING SECURE DATA TRANSFER IN A WIRELESS NETWORK

(75) Inventors: Johan Kiessling, Stockholm (SE); Jan Arwald, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 384 days.

(21) Appl. No.: 09/676,186

(22) Filed: Sep. 29, 2000

(30) Foreign Application Priority Data

Oct. 1, 1999 (SE) .............................................. 9903560

(51) Int. Cl.⁷ ............................. H04N 1/66; H04N 1/68; H04N 3/16
(52) U.S. Cl. ...................... 455/411; 455/410; 455/466; 380/247; 380/248; 380/249; 380/250
(58) Field of Search ................................ 455/410, 411, 455/466, 558; 380/247, 248, 249, 250

(56) References Cited

U.S. PATENT DOCUMENTS

| | | | | |
|---|---|---|---|---|
| 5,425,077 A | * | 6/1995 | Tsoi ............................ 455/566 |
| 5,608,778 A | | 3/1997 | Partridge, III | |
| 6,373,946 B1 | * | 4/2002 | Johnston .................... 380/211 |
| 6,463,534 B1 | * | 10/2002 | Geiger et al. ............... 713/168 |
| 6,480,957 B1 | * | 11/2002 | Liao et al. .................. 713/170 |

FOREIGN PATENT DOCUMENTS

| | | | |
|---|---|---|---|
| DE | 198 16 575 A1 | | 1/1999 |
| DE | 199 32 974 A1 | | 2/2000 |
| FR | 2817107 A | * | 5/2002 |
| WO | 97/50207 A1 | | 12/1997 |
| WO | 98/17029 A1 | | 4/1998 |
| WO | 98/37663 A1 | | 8/1998 |
| WO | WO9857511 | * | 12/1998 |
| WO | 99/01848 A1 | | 1/1999 |
| WO | WO9925093 | * | 5/1999 |
| WO | 99/33221 A1 | | 7/1999 |
| WO | WO9939524 | * | 9/1999 |
| WO | 99/66705 A1 | | 12/1999 |
| WO | 00/02358 A1 | | 1/2000 |
| WO | WO0048416 | * | 9/2000 |

* cited by examiner

Primary Examiner—Nick Corsaro
Assistant Examiner—Sujatha Sharma
(74) Attorney, Agent, or Firm—Potomac Patent Group PLLC

(57) ABSTRACT

A method for executing secure data transfer between a communication device and an application server in a wireless network, in which a request requiring a secure transaction of data is sent from either the communication device or the server. An agreement proposal for the secure transaction is sent to the communication device, and if the agreement proposal is considered acceptable, the agreement proposal is sent to a security adapter. Details of the transaction are entered into a message and sent to a smart card in order to activate a signing application in the smart card. The details of the transaction are displayed on the communication device, and if the transaction is accepted, the signing application signs the data and sends it to the security adapter via messages, the signature is verified, and the data is sent to the server.

20 Claims, 4 Drawing Sheets

METHOD AND APPARATUS FOR EXECUTING SECURE DATA TRANSFER IN A WIRELESS NETWORK

This application claims priority under 35 U.S.C. §§ 119 and/or 365 to 9903660-2 filed in Sweeden on Oct. 1, 1999; the entire content of which is hereby incorporated by reference.

BACKGROUND OF THE INVENTION

The present invention relates to a method and apparatus for secure data transfer between a communication device and an application server in a wireless network, and more particularly to a method for secure data transfer between a communication device, provided with a SIM card, and an application server in a wireless network using WAP (Wireless Application Protocol) for the data transfer, wherein said SIM card contains a secret/private key, an algorithm for signing of data, a SAT application for handling the signing dialogue and the signing of data.

Several protocols for data transfer over wireless networks have been proposed by different mobile phone manufactures. Ericsson, Motorola, Nokia Mobile Phones, and Uniwired Planet have developed a joint standard called Wireless Application Protocol (WAP). The purpose of the Wireless Application Protocol is to provide operators, infrastructure and terminal manufactures, and content developers a common environment enabling development of advanced services for digital mobile phones and other wireless terminals or portable communication devices. For example, the WAP enables e-mail and Internet access from a digital mobile phone.

Certain services and WAP applications provided via Internet, such as ordering, order confirmations, bank services, etc, and associated transactions require a high level of security.

WO 99/01848 discloses a procedure, which is applicable for the control of keys to applications making use of the subscriber identity module (SIM) in a mobile phone and for the control of license agreements concerning the use of such applications. Further, the procedure provides data security that allows safeguarding of the interests of the operator, module manufacturer, application developers and users of applications. A key list comprising one or more application-specific keys is stored in the subscriber identity module. A corresponding list is also stored in an application control server connected to the network, which takes care of the control of applications stored in subscriber identity modules. The application stored in the subscriber identity module is activated and/or closed by using the key list.

DE-A1-198 16 575 describes a method for running special applications, such as a virtual charge card, entirely or partly, in a SXM. Further, it is suggested using the SIM toolkit as a means for communication. Security is provided by means of the conventional security means and procedure of the SIM-card. For example, an anti theft security for the special application authorization and the service data in combination with one or more PIN-codes of the SIM-card.

WO 98/37663 discloses a method for checking authorisation incorporating a way to impart to a smart card an encryption key and including a way to cause a microprocessor, by means of the encryption key and at least one number, to perform a calculation whose result comprises a first signature. The signature together with said number are transferred to a system for which authorisation is to be shown which includes a computer in which said encryption key is stored. The computer is programmed to carry out the calculation to obtain the signature and then to compare the latter signature with the first signature for the verification.

In the above mentioned methods all information transfer is done through SAT (SIM Application Toolkit) applications, in which the security solution also is implemented.

Another way of solving the security problem is to provide one-time password pads, wherein a "new" password is entered via the key pad of the mobile phone or the communication device every time an application is used.

There are several problems and disadvantages associated with the above mentioned prior art solutions. The security level is to low for higher values: passwords could be discovered and the password has to be entered manually making WAP applications very user unfriendly compared to for example pure SAT applications and, of course, the password has to be remembered.

It is an object of the present invention to provide an improved method and system for executing secure data transfer between a communication device, provided with a smart card, such as a SIM card, and an application server in a wireless network using a data transfer protocol such as WAP (Wireless Application Protocol) for the data transfer.

This in accomplished by a method and system according to the invention for executing secure data transfer on the application level for communication applications executing on mobile phones according to the invention. The smart card contains a secret/private key, an algorithm for signing of data, a signing application for handling the signing dialogue and the signing of data. A communication application, such as a WAP application, is installed on the communication device enabling communication with the application server by means of a dialogue, and information browsing on the server is initiated from the communication device, wherein data are transferred between the server and the communication device. Further, a request requiring a secure transaction of data is send from the communication device to the server, and an agreement proposal for the secure transaction is send from the server to the communication device. If the agreement proposal in considered acceptable, the agreement proposal is returned to a security adapter. The WAP application in the communication device is suspended or terminated. Details of the transaction to be secured and a sign request are entered into at least a message, such as SMS or USSD packets, from the adapter to the smart card in the communication device in order to activate the signing application. The details of the transaction and a prompt for an accept are displayed on the communication device. If the transaction is accepted, the signing-application signs the data to be send with the secret/private key by using the algorithm, the signed data are send from the communication device to the security adapter via messages. The signature is verified and the verified signed data are send to the server for the final execution of the transaction.

Another object of the invention is to provide an apparatus for connection to a wireless network for monitoring the data transfer between the communication device and the application server.

This is accomplished by a security adapter according to the invention, providing a high level of security in data transfer on the application level for communication applications executing on communication devices.

An advantage of the present invention is that a high level of security in the data transfer is achieved in combination with conventional WAP browsing. An additional advantage is that the application on the SIM card can be made very thin and flexible, because it only has to handle signing of data and no information or menu handling. Further, the system handling the information browning and the system handling the security of the transacrtions are separated and, therefore, they can be uppdated and changed independently.

BRIEF DESCRIPTION OF THE DRAWINGS

Other objects, advantages and features of the invention will become more apparent from the following detailed description when taken in conjunction with the accompanying drawings, in which.

DETAILED DESCRIPTION

Figure 1:
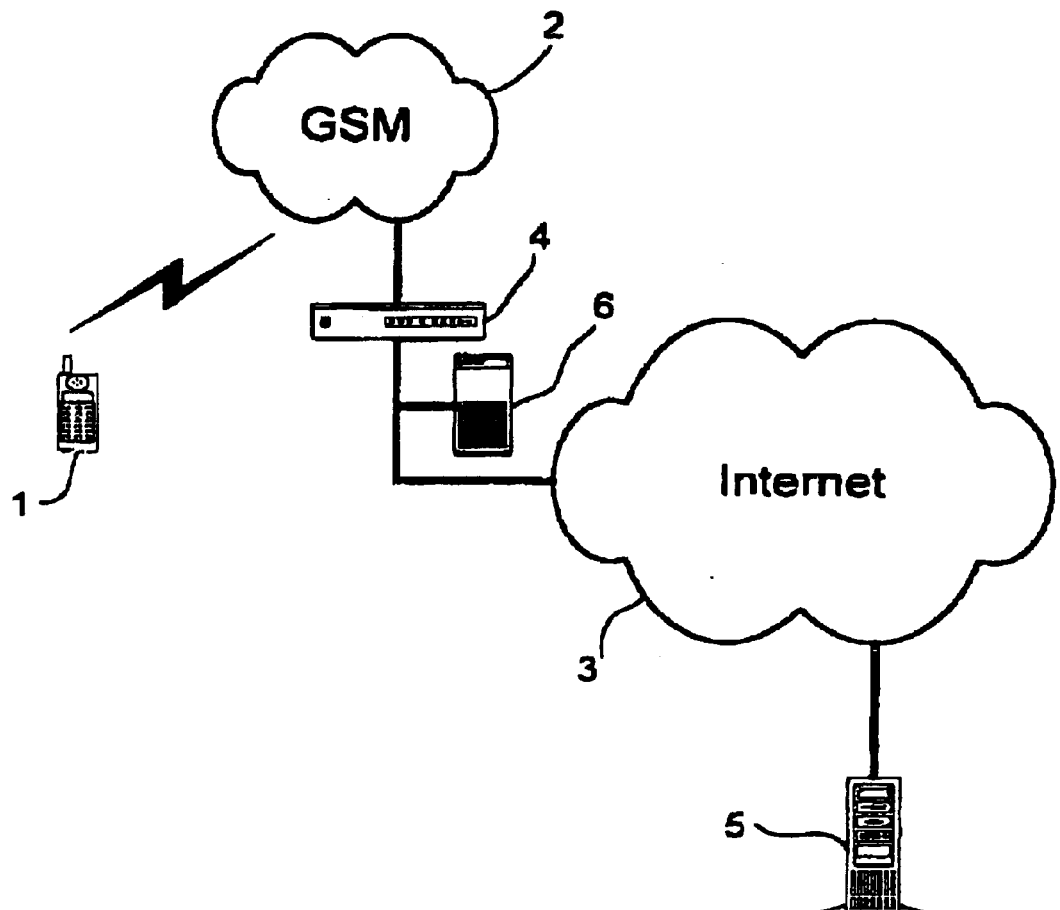
FIG. 1 illustrates a first embodiment of a network configuration comprising a security adapter according to the invention.

With reference to FIG. 1 of the drawing, there is shown a first embodiment of a network configuration for executing secure data transfer between a communication device, such as a mobile phone, and an application server in a wireless network using WAP (Wireless Application Protocol) for the data transfer. The network configuration comprises a WAP (Wireless Application Protocol) mobile phone 1—provided with a subscriber identity module (SIM)—for communication with a GSM (Global System for Mobile communications) mobile communication network 2. Additionally, the SIM card contains a secret/private key, an algorithm for signing of data to be transferred, and a SAT (SIM Application Toolkit) application for handling the signing dialogue and the signing of data. The GSM network 2 is connected to the Internet 3 via a WAP-gateway 4. Further, an application server 5 providing WAP applications is also connected to the Internet 3. Additionally, a security adapter 6 according to the invention is connected to the WAP-gateway for monitoring the communication between the mobile phone 1 and the application server 5.

Figure 2:
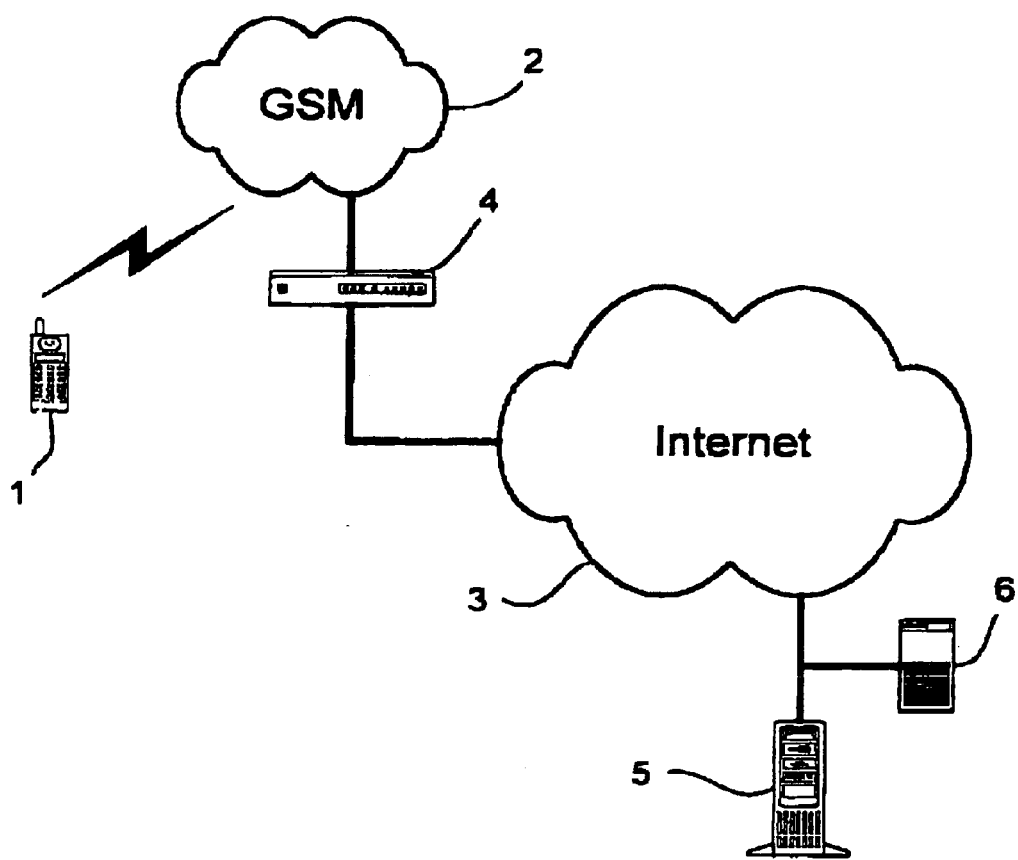
FIG. 2 illustrates a second embodiment of a network configuration comprising a security adapter according to the invention.

A second embodiment of a network configuration comprising a security adapter 6 according to the invention is shown in FIG. 2. In this embodiment of the network configuration the security adapter 6 is connected to the application server 5.

Figure 3:
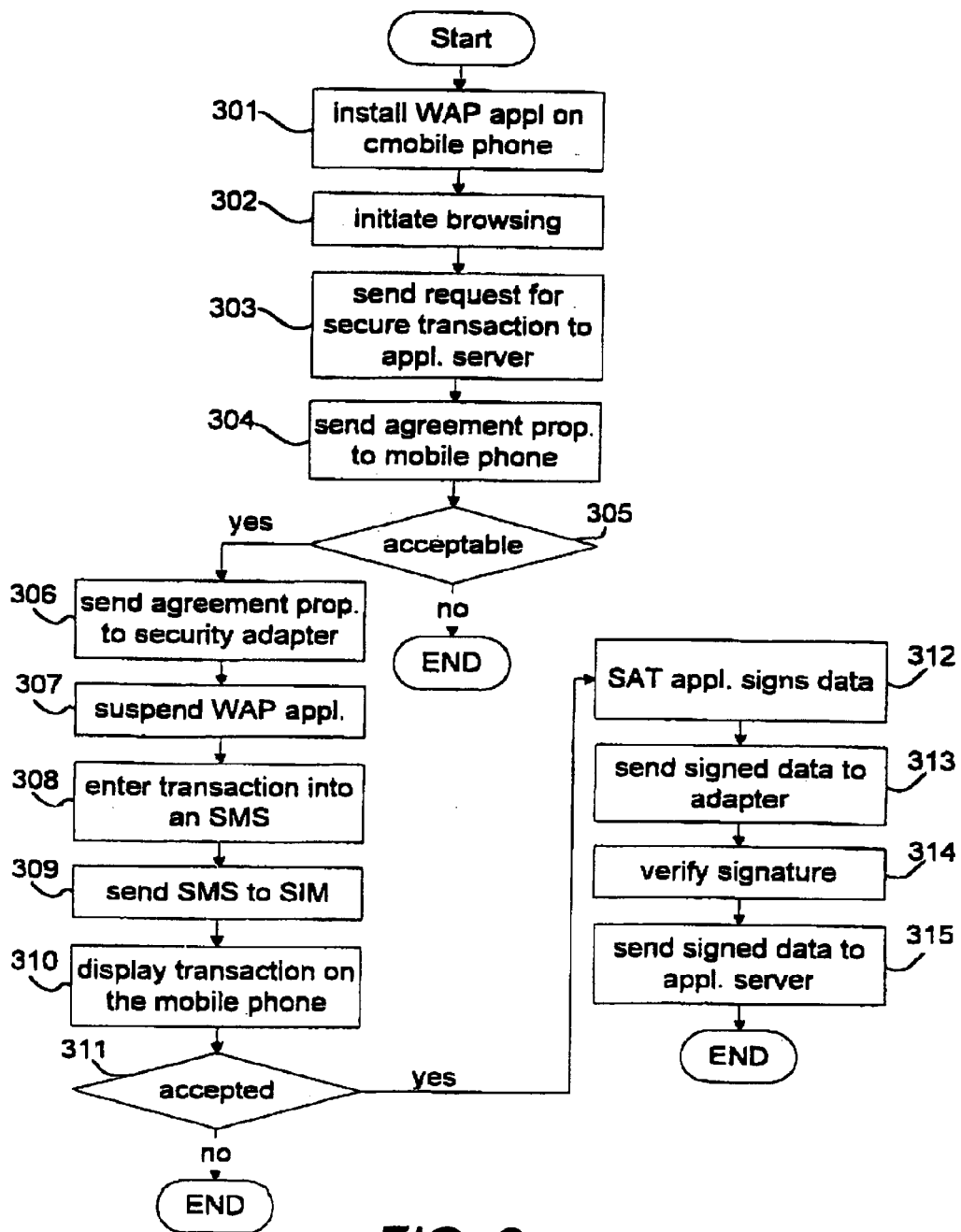
FIG. 3 is a flowchart of a first embodiment of the method according to the invention.

FIG. 3 is a flowchart of a first embodiment of the method according to the invention for executing secure data transfer between a mobile phone and an application server in a wireless network.

In a first step 301, a WAP application, such as a microbrowse, is installed on the mobile phone 1 enabling communication with the application server 5 by means of a WAP dialogue.

A conventional information browsing session on the server is initiated either by a user (subscriber) from the mobile phone 1 or the application server 5 in step 302, wherein data are transferred to/from the mobile phone 1, over the GSM network 2 interfacing the Internet via the WAP gateway, from/to the application server 5. For example, a user browses to a web site providing information accessible via a WAP dialogue from the mobile WAP phone 1. The site belongs to a bookstore offering a service wherein books can be bought directly from the site. A book is selected by the user from a list of books presented on the site. When the user decides to bye the book he selects "order" from an order menu of the site. This action initiates a sequence of operations.

First a request requiring a secure transaction of data is send from the mobile phone to the application server 5 or from the application server to the mobile phone 1 in step 303. An agreement proposal for the secure transaction is send from the server 5 to the mobile phone in step 304. If the agreement proposal is considered acceptable by the user in step 305, the agreement proposal is send to the security adapter 6 in step 306, and the WAP application in the communication device is suspended or terminated in step 307.

Details of the transaction to be secured and a sign request are entered into at least one SMS or USSD packet by the security adapter 6 in step 308. The SMS packet(s) is send from the security adapter 6 to the SIM card in the mobile phone in order to activate the SAT application in stop 309. The details of the transaction and a prompt for an accept from the user are displayed on the communication device in step 310. If the transaction is accepted in step 311, the SAT application signs the data to be send with the secret/private key by using the algorithm in step 312.

The signed data is send from the communication device 1 to the security adapter 6 via SMS or USSD packets in step 313. The security adapter 6 forwards the signature for verification in an entity, such as a backend system, operatively connected to the server 5 in stop 314, and the verified signed data is send to the server for the final execution of the transaction in step 315.

Figure 4:
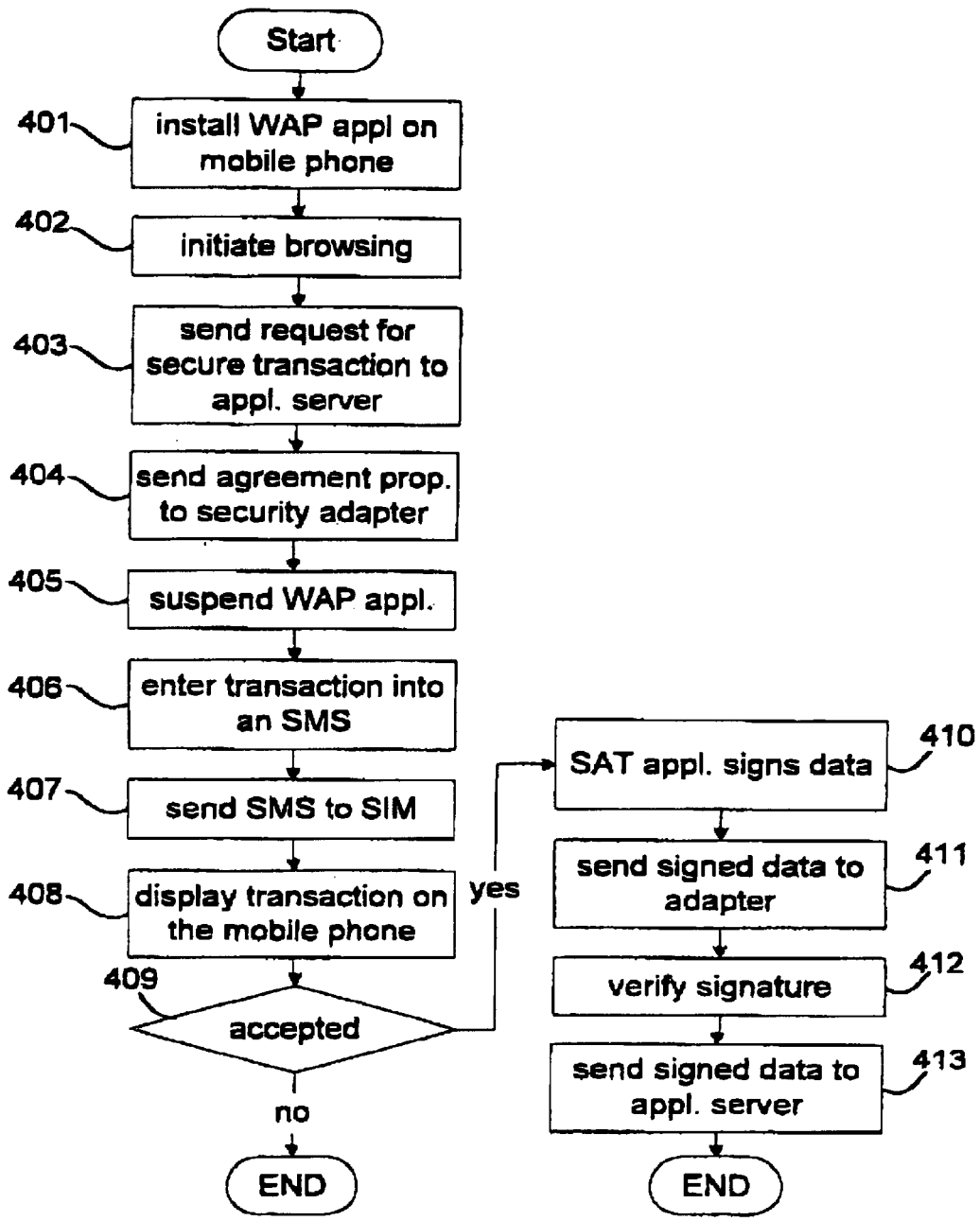
FIG. 4 is a flowchart of a second embodiment of the method according to the invention.

A flowchart of a second embodiment of the method according to the invention is shown in FIG. 4. A WAP application is installed on the mobile phone 1 enabling communication with the application server 5 by means of a WAP dialogue in step 401.

Information browsing on the server 5 is initiated from either the application server 5 or the mobile phone 1, wherein data are transferred over the network between the application server 5 and the mobile phone 1 in step 402.

Similar to the first embodiment described above, a request requiring a secure transaction of data is send either from the mobile phone 1 to the application server 5 in step 403, or from the application server 5 to the mobile phone 1. However, in this embodiment of the invention an agreement proposal for the secure transaction is send from the server 5 directly to the security adapter 6 in step 404, and the WAP application in the communication device is suspended or terminated in step 405.

Then, details of the transaction to be secured and a sign request are entered into at least one SMS or USSD packet in step 406, the at least one packet is send from the security adapter 6 to the SIM card in the communication device 1 in order to activate the SAT application in step 407. Further, the details of the transaction are displayed on the mobile phone 1 and it is prompted for an accept from the user in step 408. Thus, if the agreement proposal is considered acceptable and the transaction is accepted in step 409, the SAT application signs the data to be send with the secret/private key by using the algorithm in step 410.

The signed data is send from the mobile phone 1 to the security adapter via SMS or USSD packets in step 411, the signature is verified in an entity operatively connected to the server 5 in step 412, and the verified signed data is send to the server for the final execution of the transaction 413.

It is to be understood that even though numerous features and advantages of the present invention have been set forth above, together with details of the configuration and function of the invention, the disclosure is illustrative only.

For example, in alternative embodiments of the invention the security application on the SIM can be activated either directly from the mobile phone or from a bluetooth connection. In themes cases the answer could be stored in an Elementary File on the SIM card for later retrieval. Further, this should be combined with another Elementary File containing the status of the action.

In another embodiment of the invention a more generic solution for handling the dialogue with the user is implemented. A command interpreter implemented on the SIM card is used, allowing more dynamic downloading/updating of commands defining the application that communicates with the user.

In an alternative embodiment of the network configuration any communication device having transmitting/receiving capability, such as a portable computer, can be provided with a smart card for secure data transfer over a wireless network.

In still another embodiment of the invention the mobile phone have means whereby the user can be assured that he is really communicating directly with the security application and not with an application impersonating the real application. This is implemented as a particular icon, character, font, colour etc only available to certain applications or the operating system in the phone.

In one embodiment of the security adapter 6, it is an electronic apparatus with digital computer capabilities and an internal memory for storage of a computer program product or element. The computer program product comprises software code portions for performing the operation and functions of the security adapter 6, i.e receive an agreement proposal for a secure transaction from the communication device 1, create and send a message to the communication device in order to activate the signing application, receive signed data send from the communication device 1, and send the signed data for verification and then further to the application server 5 for execution of the transaction. In an alternative embodiment, the computer program embodied on a computer readable medium.

What is claimed is:

1. A method for executing secure data transfer between a communication device and an application server, wherein data are transferred over a network between the application server and the communication device, comprising:

sending an agreement proposal for a secure transaction of data from the server to a security adapter connected to the network, said security adapter residing on the network distinctly from the server and the communication device, creating and sending a message from the security adapter to the communication device in order to activate a signing application, the signing application signing the data to be sent, sending the signed data from the communication device to the security adapter, verifying the signature for the data, and sending the verified signed data to the server for execution of the transaction.

2. A method according to claim 1, wherein information browsing on the server is initiated from either the application server or the communication device, wherein data are transferred over the network between the application server and the communication device.

3. A method according to claim 1, comprising before the step of sending an agreement proposal, the further step of:

sending a request requiring a secure transaction of data, either from the communication device to the application server, or from the application server to the communication device.

4. A method according to claim 1, wherein the step of sending a message from the security adapter to the communication device in order to activate a signing application further comprises the steps of:

entering details of the transaction to be secured and a sign request into at least one message, sending the at least one message from the security adapter to a smart card in the communication device for activating the signing application, displaying the details of the transaction and a prompt for an accept on the communication device.

5. A method according to claim 1, wherein the step of signing the data further comprises the step of:

accepting the transaction, the signing application signing the data to be sent with a secret/private key by using an algorithm.

6. A method according to claim 1, wherein the step of sending an agreement proposal comprises the further step of:

sending the agreement proposal for the secure transaction from the server to the communication device for acceptance before the agreement proposal is sent to the security adapter.

7. A method according to claim 4, wherein the smart card is a SIM card (subscriber identity module), the data transfer protocol is the WAP (Wireless Application Protocol), the signing application is a SAT (SIM Application Toolkit) application, the communication application is a WAP application, and the message is at least an SMS or USSD packet.

8. A method according to claim 7, wherein the WAP application in the communication device is suspended or terminated when the SAT application is activated.

9. A system for executing secure data transfer between a communication device and an application server over a wireless network, comprising a security adapter connected to the network for monitoring the data transfer between the communication device and the application server, wherein said server is adapted to send an agreement proposal for a secure transaction of data to the security adapter, said security adapter residing on the network distinctly from the server and the communication device, said security adapter is adapted to receive said agreement proposal for a secure transaction from the server, and create and send a message to the communication device for activating a signing application, said communication device is adapted to sign the data, and send the signed data to the security adapter, said security adapter is adapted to receive, and send the signed data for verification and then send the verified signed data to the application server for execution of the transaction.

10. A system according to claim 9, wherein said communication device comprises a secret/private key, an algorithm for signing of data, and a signing application for handling a signing dialogue and the signing of data.

11. A system according to claim 10, wherein said secret/private key, said algorithm, and said signing application is stored on a smart card such as a SIM card (subscriber identity module), the data transfer protocol is the WAP (Wireless Application Protocol), the signing application is a SAT (SIM Application Toolkit) application, and the message is at least an SMS or USSD packet.

12. A system according to claim 9, wherein said network comprises a mobile telephone network for connection to the communication device, the Internet for the connection to the application server, and a WAP gateway connecting the mobile telephone network to the Internet.

13. A system according to claim 12, wherein said security adapter is connected to the WAP gateway.

14. A system according to claim 9, wherein in said security adapter is connected to the application server.

15. A system according to claim 9, wherein said communication device is a mobile phone or a portable computer having transmitting/receiving capability.

16. A system according to claim 15, wherein the mobile phone comprises means for displaying a particular icon, character, font, or colour connected to certain applications or the operating system in the phone, wherein the user can be assured that he is really communicating directly with the security application.

17. A security adapter for connection to a wireless network for monitoring the data transfer between a communication device and an application server connected to the network, wherein means for receiving an agreement proposal for a secure transaction from the communication device, means for creating and sending a message to the communication device in order to activate a signing application, means for receiving signed data sent from the communication device, and means for sending the signed data for verification and then to the application server for execution of the transaction, wherein said security adapter resides on the network distinctly from the server and the communication device.

18. A computer program product directly loadable into the internal memory of a security adapter with digital computer capabilities, comprising software code portions for performing the steps of:

receiving an agreement proposal for a secure transaction from a communication device, creating and sending a message to the communication device in order to activate a signing application, receiving signed data sent from the communication device, and sending the signed data for verification and then to an application server for execution of the transaction, wherein said security adapter resides on the network distinctly from the server and the communication device.

19. A computer program element comprising computer program code means to make a security adapter with digital computer capabilities execute the steps of: receiving an agreement proposal for a secure transaction from a communication device, creating and sending a message to the communication device in order to activate a signing application, receiving signed data sent from the communication device, and sending the signed data for verification and then to an application server for execution of the transaction, wherein said security adapter resides on the network distinctly from the server and the communication device.

20. A computer program element as claimed in claim 19 embodied on a computer readable medium.

* * * * *

UNITED STATES PATENT AND TRADEMARK OFFICE
CERTIFICATE OF CORRECTION

PATENT NO. : 6,915,124 B1  Page 1 of 1
APPLICATION NO. : 09/676186
DATED : July 5, 2005
INVENTOR(S) : Kiessling et al.

It is certified that error appears in the above-identified patent and that said Letters Patent is hereby corrected as shown below:

Col. 1, line 6, change "9903660-2 filed in Sweeden" to --9903560-2 filed in Sweden--;

and line 54, change "SXM" to -- SIM--

Col. 2, line 24, change "in" to --is--

Col. 3, line 3, change "browning" to --browsing--

Col. 4, line 20, change "stop" to --step--; and line 30, change "stop" to --step--

Col. 5, line 8, change "themes" to --theses--

Col. 5, line 43, change "program embodied" to --program element is embodied--

Signed and Sealed this

Eighth Day of August, 2006

JON W. DUDAS
*Director of the United States Patent and Trademark Office*